(12) United States Patent
Kwak et al.

(10) Patent No.: US 10,473,520 B2
(45) Date of Patent: Nov. 12, 2019

(54) LIGHT SOURCE DEVICE FOR CALIBRATING IMAGE SENSOR

(71) Applicant: Samsung Electronics Co., Ltd., Suwon-si (KR)

(72) Inventors: Sung-Young Kwak, Yongin-si (KR); Yong-Gu Lee, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 703 days.

(21) Appl. No.: 14/757,726

(22) Filed: Dec. 23, 2015

(65) Prior Publication Data

US 2016/0178163 A1    Jun. 23, 2016

(30) Foreign Application Priority Data

Dec. 23, 2014    (KR) .................... 10-2014-0186888

(51) Int. Cl.
*G01J 1/44* (2006.01)
*G01J 1/08* (2006.01)
*G01J 1/04* (2006.01)

(52) U.S. Cl.
CPC .............. *G01J 1/44* (2013.01); *G01J 1/0418* (2013.01); *G01J 1/0474* (2013.01); *G01J 1/0488* (2013.01); *G01J 1/08* (2013.01)

(58) Field of Classification Search
CPC .......... G02B 5/201; G02B 5/223; G02B 5/22; G02B 5/003; G02B 7/006; G02B 5/20; G02F 1/133514; G03F 7/0007; G01J 1/44; G01J 1/0418; G01J 1/0474; G01J 1/08; G01J 1/0488

USPC ................. 359/885, 889, 890, 891, 892
See application file for complete search history.

(56) References Cited

U.S. PATENT DOCUMENTS

| | | | | |
|---|---|---|---|---|
| 5,485,201 A | * | 1/1996 | Aoki | G03B 7/16 348/223.1 |
| 6,755,555 B2 | * | 6/2004 | Bloom | G02B 5/22 362/281 |
| 7,378,784 B1 | | 5/2008 | Liu | |
| 2014/0221846 A1 | * | 8/2014 | Bambot | A61B 5/0084 600/477 |
| 2014/0362200 A1 | * | 12/2014 | Kanamori | A61B 1/0638 348/70 |

FOREIGN PATENT DOCUMENTS

| | | |
|---|---|---|
| JP | 11-178839 | 7/1999 |
| JP | 2013251154 | 12/2013 |
| KR | 101138221 | 4/2012 |

* cited by examiner

*Primary Examiner* — Jade R Chwasz
(74) *Attorney, Agent, or Firm* — Jefferson IP Law, LLP

(57) ABSTRACT

A light source device for calibrating an image sensor is provided. The light source device includes a light source unit for outputting light, a transform filter unit for controlling a color temperature according to a wavelength of the light received from the light source unit, and a plurality of diffusion plates for controlling a ratio of long-wavelength light to short-wavelength light, the long-wavelength light and the short-wavelength light being output from the light source unit.

17 Claims, 12 Drawing Sheets

LIGHT SOURCE DEVICE FOR CALIBRATING IMAGE SENSOR

RELATED APPLICATION(S)

This application claims the benefit under 35 U.S.C. § 119(a) of a Korean patent application filed in the Korean Intellectual Property Office on Dec. 23, 2014 and assigned Serial No. 10-2014-0186888, the entire disclosure of which is incorporated herein by reference.

BACKGROUND

The present disclosure generally relates to a light source device, and more particularly, to a light source device for calibrating an image sensor.

In general, image devices include a digital camera, a portable-phone camera, and the like. Such an image device is equipped with a camera module and the camera module includes an image sensor. Recently, camera modules have also been included in general electronic devices.

The term "electronic device" covers home appliances and, generally, any device that executes a specific function according to a loaded program, such as an electronic note, a Portable Multimedia Player (PMP), a mobile communication terminal, a tablet Personal Computer (tablet PC), a video/audio device, a desktop/laptop computer, an in-vehicle navigator, and the like. These electronic devices may store information and then output the information visually or audibly. Along with an increase in the integration level of electronic devices and the increasing popularity of ultra high-speed, large-capacity wireless data communication, various functions have recently been loaded in a single mobile communication terminal. For example, entertainment function such as gaming, multimedia function such as music/video play, communication and security function for mobile banking, scheduling function, and electronic wallet function as well as a communication function have been integrated in a single electronic device.

A portable electronic device such as an electronic note, a PMP, a mobile communication terminal, a tablet PC, and the like is generally equipped with a flat display device and a battery. The portable electronic device generally has a shape formed around the display device and/or the battery. As display and battery technologies have progress, electronic devices are capable of being made ever smaller. Some of these include electronic devices wearable around a body part such as a wrist or the head. These small, lightweight, portable electronic devices may comprise camera modules.

In general, each pixel of an image sensor may have a unique color temperature. The color temperature of each pixel may be subject to calibration to meet the specification of the image sensor. A light source device may be used for the calibration. The calibration may involve shading for controlling contrast and Auto White Balance (AWB) for controlling a color. The calibration is a process of adjusting the characteristics of each pixel of the image sensor by comparing the color temperature of light output from the light source device with the color temperature of an image captured by the image sensor. An Image Signal Processor (ISP) may be responsible for the calibration.

To implement calibration, light of the light source device needs to have a constant color temperature and a high color rendering property. A color rendering property may be represented as a Color Rendering Index (CRI), which indicates how closely light from a light source approximates sun light. The maximum CRI is 100. Thus, a high color rendering property means a high CRI. For example, light with a high color rendering property may have, for example, a CRI close to 100.

The above information is presented as background information only to assist with an understanding of the present disclosure. No determination has been made, and no assertion is made, as to whether any of the above might be applicable as prior art with regard to the present disclosure.

SUMMARY

An aspect of the present disclosure is to provide a light source device for calibrating an image sensor that outputs high-color-rendering light, when the image sensor is calibrated.

In accordance with an aspect of the present disclosure, there is provided a light source device for calibrating an image sensor. The light source device includes a light source unit for outputting light, a transform filter unit for controlling a color temperature according to a wavelength of the light received from the light source unit, and a plurality of diffusion plates for controlling a ratio of long-wavelength light to short-wavelength light, the long-wavelength light and the short-wavelength light being output from the light source unit.

The ratio of short wavelength light to long wavelength light may be controlled by adjusting gaps between adjacent diffusion plates.

Other aspects, advantages, and salient features of the disclosure will become apparent to those skilled in the art from the following detailed description, which, taken in conjunction with the annexed drawings, discloses exemplary embodiments of the disclosure.

BRIEF DESCRIPTION OF THE DRAWINGS

The above and other aspects, features and advantages of certain exemplary embodiments of the present disclosure will be more apparent from the following description taken in conjunction with the accompanying drawings, in which.

Throughout the drawings, like reference numerals will be understood to refer to like parts, components, and structures.

DETAILED DESCRIPTION

The following description with reference to the accompanying drawings is provided to assist in a comprehensive understanding of exemplary embodiments of the disclosure as defined by the claims and their equivalents. It includes various specific details to assist in that understanding but these are to be regarded as merely exemplary. Accordingly, those of ordinary skill in the art will recognize that various changes and modifications can be made to the embodiments described herein without departing from the scope and spirit of the disclosure. In addition, descriptions of well-known functions and constructions may be omitted for clarity and conciseness.

The terms and words used in the following description and claims are not limited to the bibliographical meanings, but are merely used by the inventor to enable a clear and consistent understanding of the disclosure. Accordingly, it should be apparent to those skilled in the art that the following description of exemplary embodiments of the present disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

Figure 1:
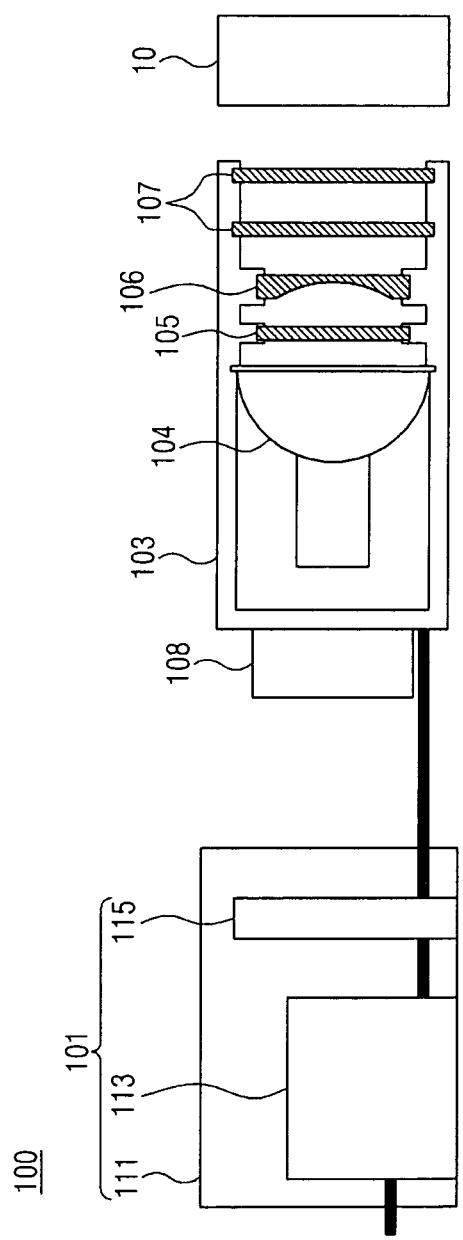
FIG. 1 is a sectional view of a light source device for calibrating an image sensor according to one of various embodiments of the present disclosure.

FIG. 1 is a sectional view of a light source device for calibrating an image sensor according to one of various embodiments of the present disclosure.

Referring to FIG. 1, a light source device 100 for calibrating an image sensor according to one of various embodiments of the present disclosure may include a power source unit 101, a light source body 103, a light source unit 104, a transform filter unit 105, a concave lens unit 106, and diffusion plates 107. The diffusion plates 107 may be referred to as a diffusion plate block. The light source device 100 for calibrating an image sensor may output light to an image sensor 10. The image sensor 10 may be included in a camera module and may be included in various electronic devices.

The power source unit 101 supplies power to the light source unit 104. The power source unit 101 may include a power source body 111, a power supply 113, and a controller 115. The power source body 111 may provide a space in which the power supply 113 and the controller 115 are provided. The power supply 113 may receive external AC power and convert it to DC power. For example, the power supply 113 may convert AC voltage of 110V or 220V to DC voltage of 12V. The controller 115 may control the voltage and/or current supplied to the light source unit 104. That is, the controller 115 may receive power from the power supply 113 and then supply the power with a controlled voltage value and current value to the light source unit 104. Further, the controller 115 may act as a switch for the light source device 100.

The light source body 103 may provide a space in which the light source unit 104, the transform filter unit 105, the concave lens unit 106, and the diffusion plates 107 are mounted. As the light source body 103 may provide space for a cable or a power line from the power source unit 101, the light source body 103 may provide a power supply path to the light source unit 104.

The light source unit 104 may output light that provides a reference for calibration of the image sensor 10. The light source unit 104 may use, for example, a halogen lamp as a light source. The light source unit 104 may be used, for example, under a rated condition of DC 12V and 35 W. If the light source unit 104 includes a halogen lamp as a light source, light output from the light source unit 104 may have a color temperature of about 3100 K under the rated condition. However, the light source unit 104 may output light having a different color temperature depending on the type of the light source or the power controlled by the controller 115. For example, light output from the light source unit 104 below the rated condition may have a color temperature of about 2600 K. Exemplary characteristics of light output from the light source unit 104 will be described below with reference to FIG. 2.

Figure 2:
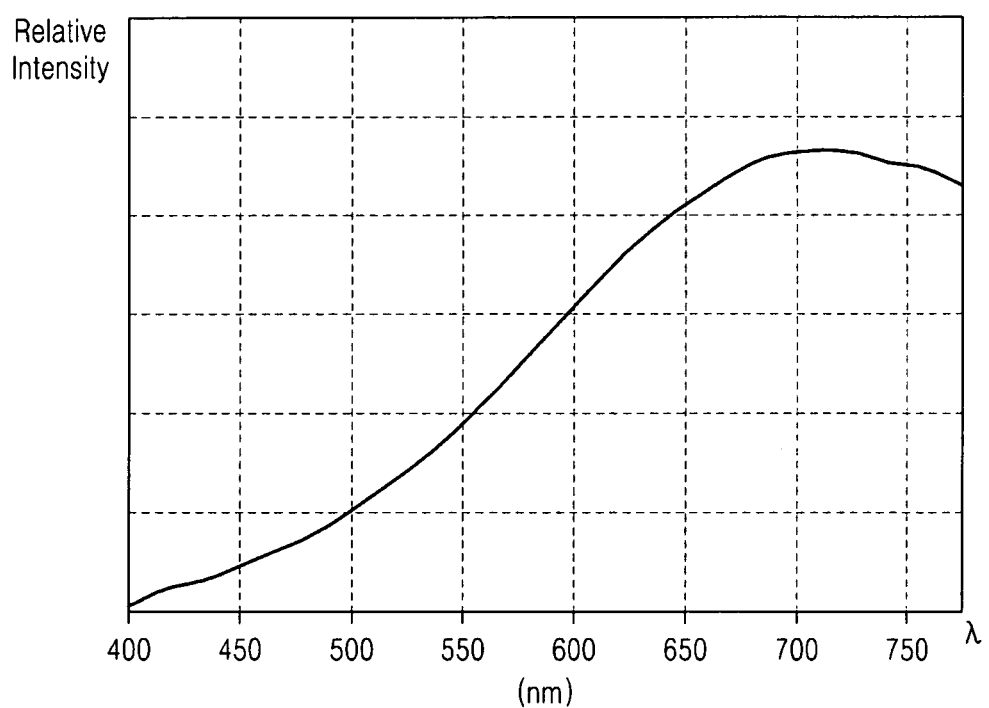
FIG. 2 is a graph illustrating the spectrum of light output from a light source unit applied to a light source device for calibrating an image sensor according to various embodiments of the present disclosure.

FIG. 2 is a graph illustrating the spectrum of light output from a light source unit applied to a light source device for calibrating an image sensor according to various embodiments of the present disclosure.

Referring to FIG. 2, the spectrum of light emitted from the light source unit 104 demonstrates that the relative intensity of light gradually increases as wavelength increases and has a peak value at an approximate wavelength of 700 nm.

Referring to FIG. 1 again, the transform filter unit 105 may change the color temperature of light output from the light source unit 104. For example, if light output from the light source unit 104 has a color temperature ranging substantially from 2600 K to 3100 K, the color temperature of the light may be substantially from 4500 K to 6500 K after the light passes through the transform filter unit 105.

Figure 3:
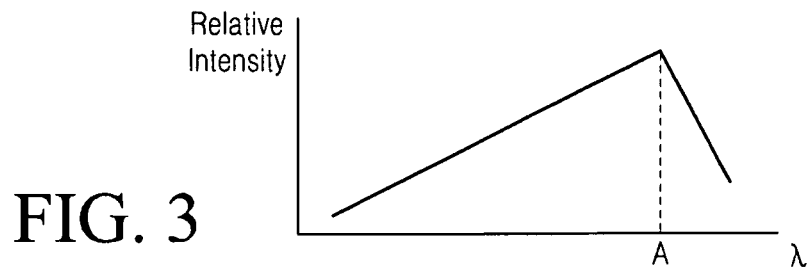
FIG. 3 is a graph illustrating the spectrum of light output from a light source unit when first power is supplied to the light source unit in a light source device for calibrating an image sensor according to various embodiments of the present disclosure.
Figure 4:
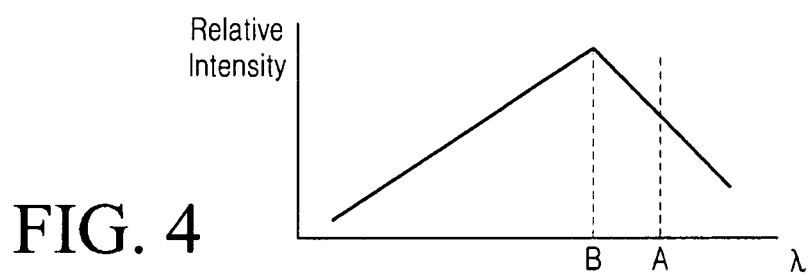
FIG. 4 is a graph illustrating the spectrum of light output from a light source unit when second power is supplied to the light source unit in a light source device for calibrating an image sensor according to various embodiments of the present disclosure.
Figure 5:
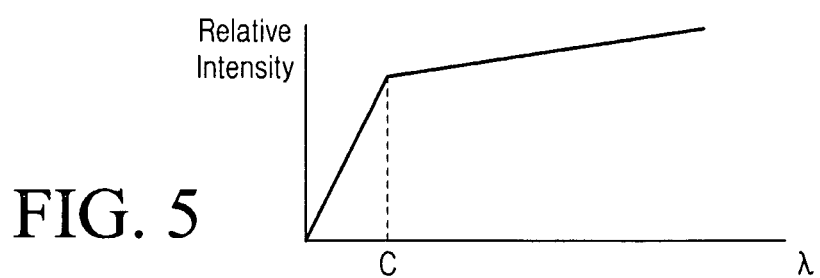
FIG. 5 is a graph illustrating the spectrum of light output from a transform filter unit when the first power is supplied to a light source unit in a light source device for calibrating an image sensor according to various embodiments of the present disclosure.
Figure 6:
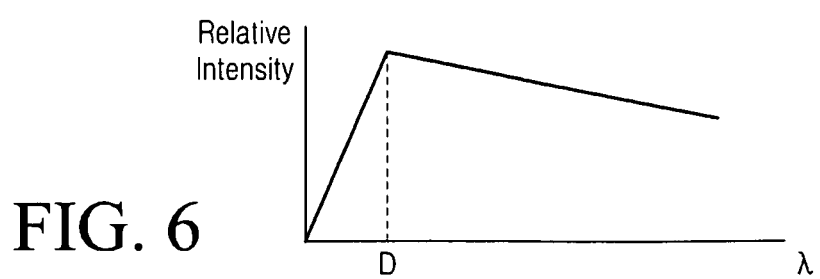
FIG. 6 is a graph illustrating the spectrum of light output from a transform filter unit when the second power is supplied to a light source unit in a light source device for calibrating an image sensor according to various embodiments of the present disclosure.

FIG. 3 is a graph illustrating the spectrum of light output from the light source unit when first power is supplied to the light source unit, in a light source device for calibrating an image sensor according to various embodiments of the present disclosure. FIG. 4 is a graph illustrating the spectrum of light output from the light source unit when second power is supplied to a light source unit, in a light source device for calibrating an image sensor according to various embodiments of the present disclosure. FIG. 5 is a graph illustrating the spectrum of light output from a transform filter unit when the first power is supplied to a light source unit, in a light source device for calibrating an image sensor according to various embodiments of the present disclosure. FIG. 6 is a graph illustrating the spectrum of light output from a transform filter unit when the second power is supplied to a light source unit, in a light source device for calibrating an image sensor according to various embodiments of the present disclosure.

Referring to FIGS. 3 to 6, the spectrums of light output from the light source unit 104 and the transform filter unit 105 may be controlled by controlling power from the power source unit 101.

The power source unit 101 may supply a first power that is less than the 35 W of the rated condition to the light source unit 104. Light output from the light source unit 104 may have a color temperature of about 2600 K. As illustrated in FIG. 3, the relative intensity of light from the light source unit 104 may increase as wavelengths increase to wavelength A and then decreases as wavelengths increase beyond wavelength A. That is, the light source unit 104 that receives the first power may have relative peak intensity at wavelength A.

Subsequently, the light source unit 104 that has received the first power may output light to the transform filter unit 105. As illustrated in FIG. 5, the transform filter unit 105 may output light where the relative intensity of light may increase at a high rate as wavelengths increase to wavelength C and may then increase at a lower rate as wavelengths increase beyond wavelength C.

The power source unit 101 may supply a second power larger than the first power to the light source unit 104. Accordingly, power output by the power source unit 101 may be adjustable. Light output from the light source unit 104 may have a color temperature of about 3100 K. As illustrated in FIG. 4, the relative intensity of light from the light source unit 104 may increase as wavelengths increase to wavelength B and then decreases as wavelengths increase beyond wavelength B. That is, the light source unit 104 that receives the second power may have relative peak intensity at wavelength B, where wavelength B is shorter than wavelength A.

Accordingly, higher power to the light source unit 104 may result in light that may have increased color temperature and a higher relative intensity at shorter wavelengths.

As illustrated in FIG. 6, when the light source unit 104 receives the second power, and light is output to the transform filter unit 105, the transform filter unit 105 may output light having a relative intensity that increases at a high rate as wavelengths increase to wavelength D and may then increase at a lower rate as wavelengths increase beyond wavelength D.

As described above, the intensity of light may be controlled according to the power from the power source unit 101 and the wavelength of light output from the transform filter unit 105. Accordingly, the spectrum of light output from the light source device 100 may be controlled by combining the strength of power supplied to the light source unit 104 and the characteristics of the transform filter unit 105.

Figure 7:
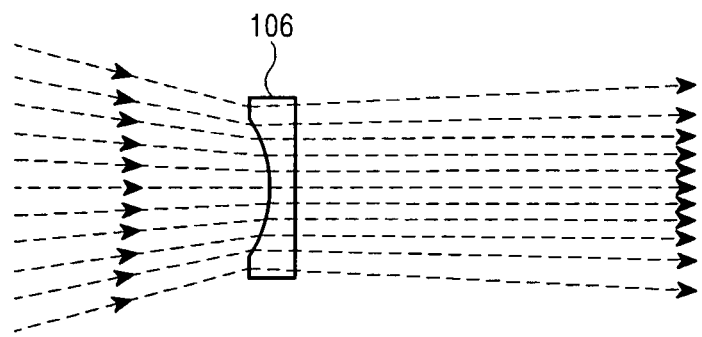
FIG. 7 illustrates light passing through a concave lens unit applied to a light source device for calibrating an image sensor according to various embodiments of the present disclosure.

FIG. 7 illustrates flows of light passing through a concave lens unit applied to a light source device for calibrating an image sensor according to various embodiments of the present disclosure.

Referring to FIGS. 1 and 7, the concave lens unit 106 may control the distribution of light that has passed through the transform filter unit 105. As illustrated in FIG. 7, the light passing through the concave lens unit 106 may travel in a direction perpendicular to the concave lens unit 106. However, the light passing through the concave lens unit 106 is not limited to paths perpendicular to the concave lens unit 106. Thus, to increase the intensity of light, the light source unit 104 may output light toward the concave lens unit 106. Further, the concave lens unit 106 may refract the light passing through the concave lens unit 106 to parallel paths. However, light passing through the concave lens unit 106 is not limited to parallel paths. For example, relative to a perpendicular line to the concave lens unit 106, the angles of the lights that have passed through the concave lens unit 106 may be smaller than the angles of the lights incident on the concave lens unit 106. For example, light output from the light source unit 104 may be projected to be concentrated on a smaller region (e.g., the concave lens unit 106), and the concave lens unit 106 may control the paths of light to be more parallel to each other.

Figure 8:
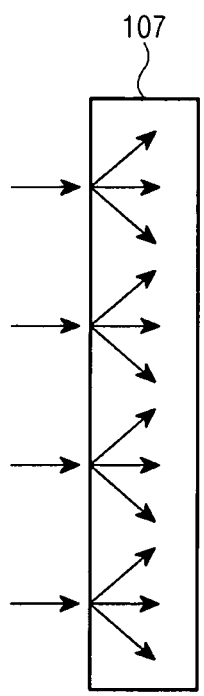
FIG. 8 illustrates a diffusion plate applied to a light source device for calibrating an image sensor according to various embodiments of the present disclosure.
Figure 9:
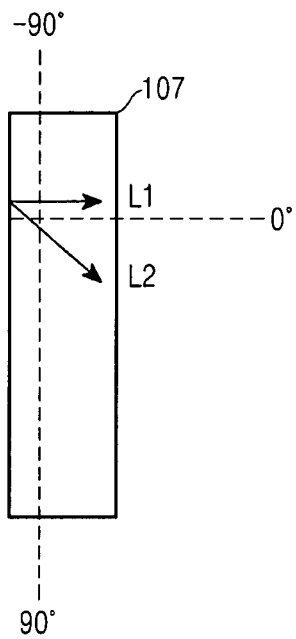
FIG. 9 illustrates an angle at which light is diffused from a diffusion plate applied to a light source device for calibrating an image sensor according to various embodiments of the present disclosure.
Figure 10:
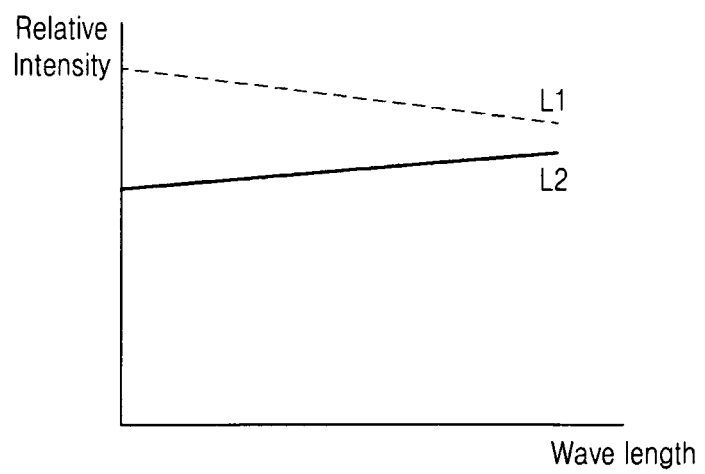
FIG. 10 is a graph illustrating the spectrum of light diffused from the diffusion plate illustrated in FIG. 9.
Figure 11:
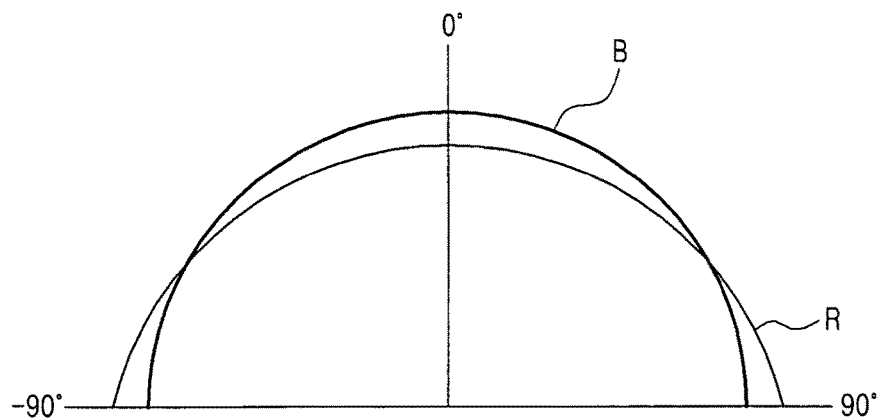
FIG. 11 illustrates a wavelength distribution at the diffusion angle illustrated in FIG. 9.

FIG. 8 illustrates a diffusion plate applied to a light source device for calibrating an image sensor according to various embodiments of the present disclosure, FIG. 9 illustrates an angle at which light is diffused at the diffusion plate for calibrating an image sensor according to various embodiments of the present disclosure, FIG. 10 is a graph illustrating the spectrum of light diffused at the diffusion plate illustrated in FIG. 9, and FIG. 11 illustrates a distribution of wavelengths at an angle at which light is diffused at the diffusion plate illustrated in FIG. 9.

FIG. 1 and FIGS. 8 to 11, the diffusion plates 107 may receive light that has passed through the concave lens unit 106. As illustrated in FIG. 8, one of the diffusion plates 107 may diffuse the light received from the concave lens unit 106 uniformly across a predetermined area. As illustrated in FIG. 9, the lights diffused at one of the diffusion plates 107 may include light L1 perpendicular to the diffusion plates 107 and light L2 at a non-perpendicular angle with respect to the diffusion plates 107. If a direction perpendicular to the diffusion plates 107 is defined as 0°, a diffusion angle may be between −90° and 90°. In a comparison between the light L1 and the light L2, the light L1 may have a larger relative intensity than the light L2, as illustrated in FIG. 10. Further, the light L1 may have a larger intensity at shorter wavelengths than at longer wavelengths, whereas the light L2 may have a larger intensity at the longer wavelengths than at the shorter wavelengths. As illustrated in FIG. 11, as the light passing through the diffusion plates 107 gets closer to 0°, the light may be composed of short-wavelength (B; blue) light at a larger proportion than long-wavelength (R; red) light, and as the light gets closer to 90° (or −90°), the light may be composed of the long-wavelength (R) light at a larger proportion than the short-wavelength (B) light. In other words, the light passing through the diffusion plates 107 travels in a different path according to its diffusion angle and the ratio between the short wavelength B and the long wavelength R of the light may vary with diffusion angles. For example, as the diffusion angle is closer to 0°, the short-wavelength (B) light may have a larger intensity than the long-wavelength (R) light, whereas as the diffusion angle is larger, the long-wavelength (R) light may have a larger intensity than the short-wavelength (B) light.

According to various embodiments, the diffusion plates 107 may be formed of a material that absorbs the short-wavelength (B) light B or the long-wavelength (R) light. For example, if the diffusion plates 107 absorb the short-wavelength (B) light, the diffusion plates 107 may increase the relative intensity of the long-wavelength (R) light. If a plurality of diffusion plates such as the diffusion plates 107 is used, the relative amounts of the short wavelength (B) and the long wavelength (R) lights may be controlled.

According to various embodiments, the light source device 100 for calibrating an image sensor may further include a fan 108. The fan 108 may discharge heat inside the light source body 103 to the outside. The fan 108 may operate by receiving power from, for example, the power source unit 101. Consequently, since the fan 108 discharges heat generated from the light source unit 104 to the outside, the fan 108 may prevent malfunction of the light source unit 104 from overheating.

Figure 12:
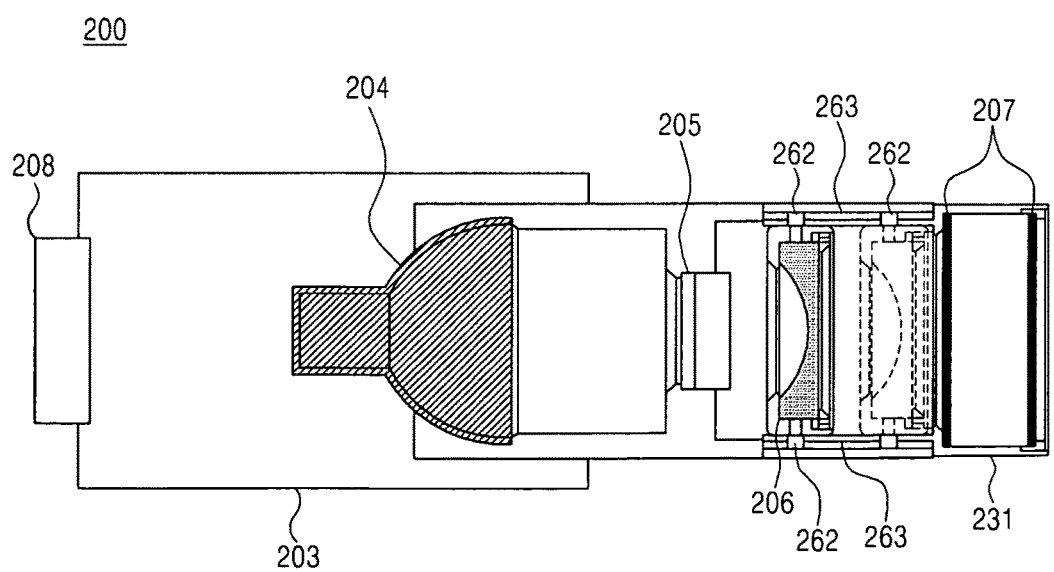
FIG. 12 is a sectional view of a light source device for calibrating an image sensor according to various embodiments of the present disclosure.
Figure 13:
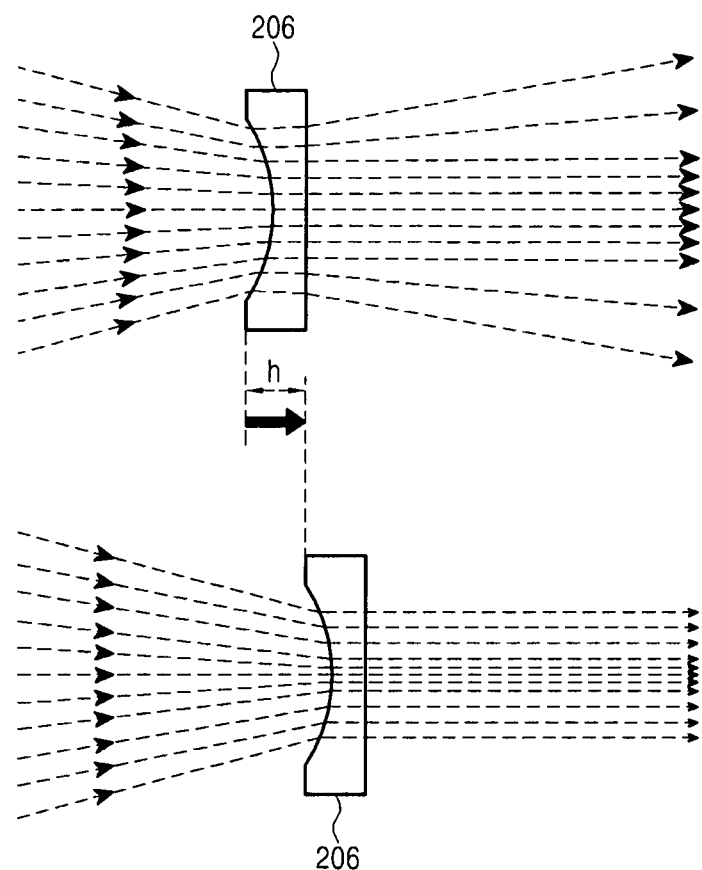
FIG. 13 illustrates flows of light according to movement of a concave lens unit applied to a light source device for calibrating an image sensor according to various embodiments of the present disclosure.

FIG. 12 is a sectional view of a light source device for calibrating an image sensor according to another of the various embodiments of the present disclosure, and FIG. 13 illustrates light flows according to movement of a concave lens unit applied to a light source device for calibrating an image sensor according to another of the various embodiments of the present disclosure.

A light source device 200 for calibrating an image sensor according to another of the various embodiments of the present disclosure may include a light source body 203, a light source unit 204, a transform filter unit 205, a concave lens unit 206, diffusion plates 207, and a fan 208. It is to be noted that if a component according to this embodiment is similar to a component according to the foregoing embodiment, a detailed description of the component may not be provided herein.

Referring to FIGS. 12 and 13, the light source device 200 for calibrating an image sensor according to various embodiments of the present disclosure may further include a rail unit 263 and a movement unit 262.

The rail unit 263 may be extended in parallel to the path of light between the transform filter unit 205 and the diffusion plates 207. The plurality of diffusion plates 207 may be referred to as a diffusion plate block. The movement unit 262 may protrude from both sides of the concave lens unit 206 and may be movably engaged with the rail unit 263. The movement unit 262 may take the form of wheels or other structures suitable for moving the concave lens unit 206. Therefore, the concave lens unit 206 may move between the transform filter unit 205 and the diffusion plates 207 by means of the movement unit 262 along the rail unit 263. If the concave lens unit 206 moves toward the diffusion plates 207 for a distance of h, the density of light reaching the diffusion plates 207 may be increased. If the density of light reaching the diffusion plates 207 increases, the intensity or brightness of light incident on the image sensor may be increased. On the other hand, as the concave lens unit 206 gets closer to the light source unit 204, less light may pass through the concave lens unit 206 and thus the density of light reaching the diffusion plates 207 may be decreased. In this manner, as the light source device 200 for calibrating an image sensor according to various embodiments of the present disclosure controls the position of the concave lens unit 206 between the transform filter unit 205 and the diffusion plates 207, the density of light output from the light source device 200, for example, the intensity or brightness of the light may be controlled.

Figure 14:
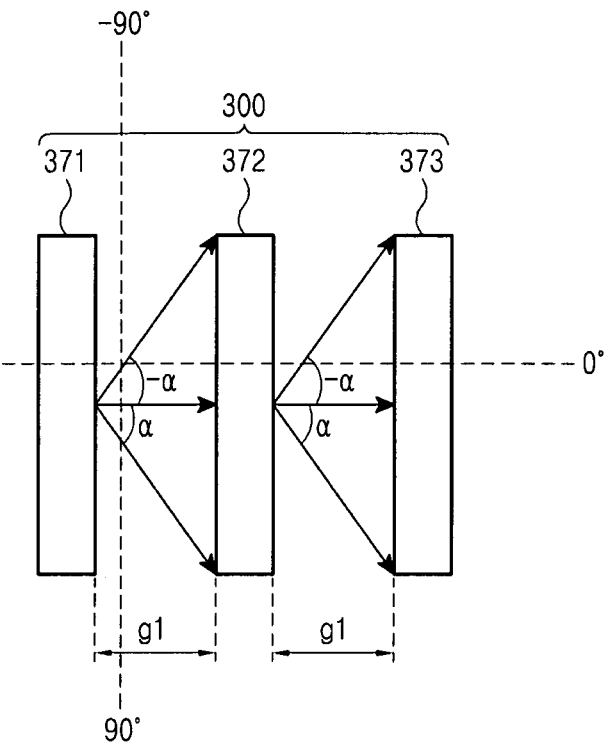
FIG. 14 illustrates a path of light according to a first gap between a plurality of diffusion plates applied to a light source device for calibrating an image sensor according to various embodiments of the present disclosure.
Figure 15:
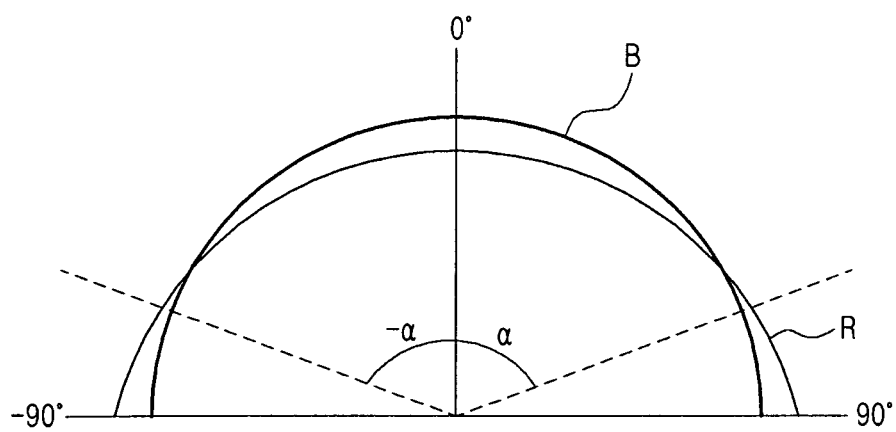
FIG. 15 is a graph illustrating a wavelength property of output light with a first gap between the diffusion plates illustrated in FIG. 14.
Figure 16:
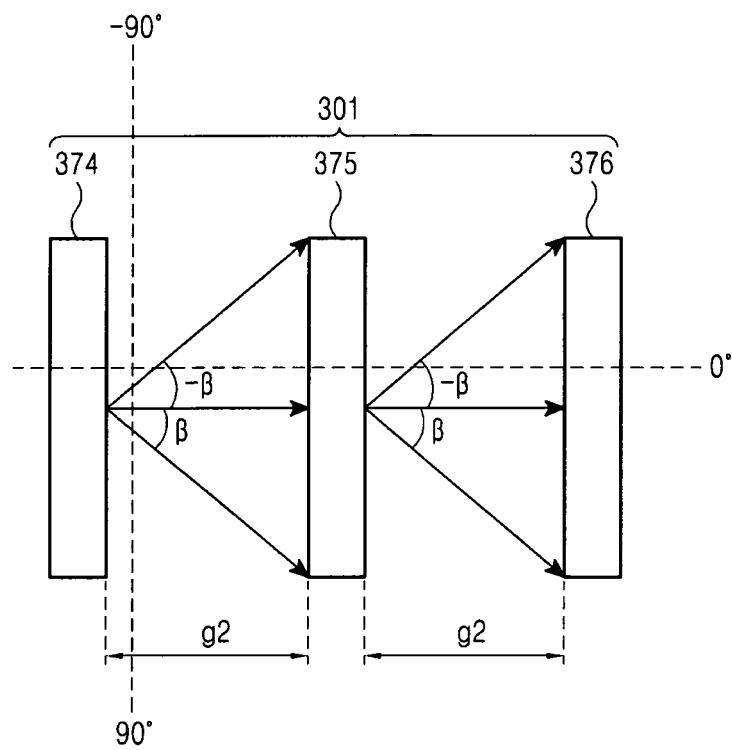
FIG. 16 illustrates a path of light with a second gap between the plurality of diffusion plates applied to a light source device for calibrating an image sensor according to various embodiments of the present disclosure.
Figure 17:
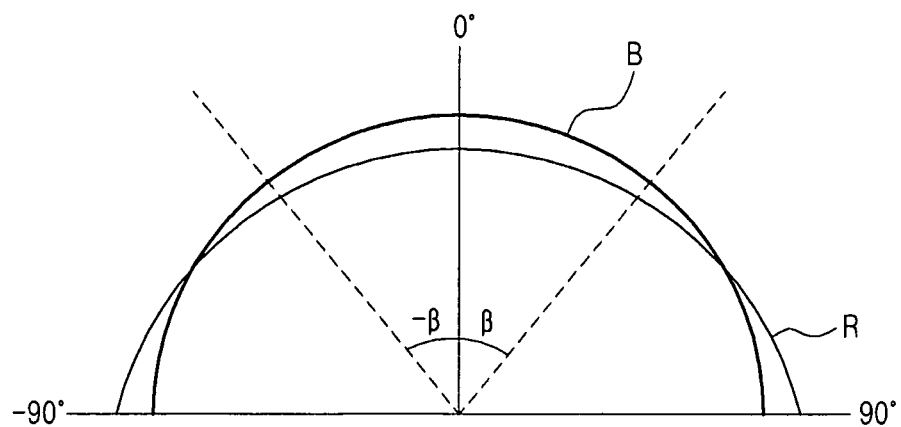
FIG. 17 is a graph illustrating a wavelength property of output light with a second gap between the diffusion plates illustrated in FIG. 15.
Figure 18:
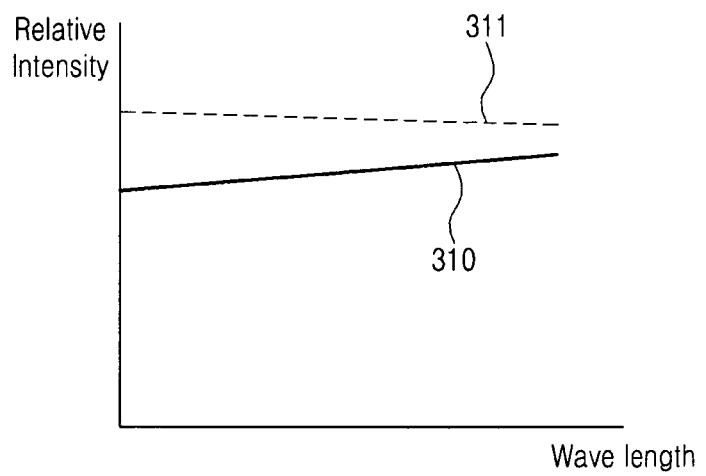
FIG. 18 is a graph comparing the spectrums of light with the first gap of FIG. 14 and the second gap of FIG. 16.

FIG. 14 illustrates light paths in the case where a plurality of diffusion plates are spaced from one another by a first gap in a light source device for calibrating an image sensor according to another of the various embodiments of the present disclosure, and FIG. 15 is a graph illustrating a wavelength property of light in the case of the first gap between the plurality of diffusion plates illustrated in FIG. 14. FIG. 16 illustrates light paths in the case where the plurality of diffusion plates are spaced from one another by a second gap in a light source device for calibrating an image sensor according to another of the various embodiments of the present disclosure, and FIG. 17 is a graph illustrating a wavelength property of light in the case of the second gap between the plurality of diffusion plates illustrated in FIG. 16. FIG. 18 is a graph comparing the spectrums of light in the cases of the first gap illustrated in FIG. 14 and the second gap illustrated in FIG. 16.

If a component according to this embodiment is similar to a component according to the foregoing embodiments, a detailed description of the component is not provided herein and the following description is given mainly of a plurality of diffusion plates.

Referring to FIGS. 14 and 15, diffusion plate block 300 applied to a light source device for calibrating an image sensor according to various embodiments of the present disclosure may include a first diffusion plate 371, a second diffusion plate 372, and a third diffusion plate 373.

The first diffusion plate 371 may be spaced from the second diffusion plate 372 by a first gap g1, and the second diffusion plate 372 may also be spaced from the third diffusion plate 373 by the first gap g1. Although the gap between the first diffusion plate 371 and the second diffusion plate 372 is equal to the gap between the second diffusion plate 372 and the third diffusion plate 373, the gaps need not be limited to being the same. Light passing though the center of the first diffusion plate 371 may be transmitted to the second diffusion plate 372 at an angle between −α and α. Although light passing through both ends of the first diffusion plate 371 may have an angle larger than α, any light passing through the first diffusion plate 371 may be defined as light passing through the center of the first diffusion plate 371. The angle α may be determined according to the first gap g1. Likewise, light passing though the center of the second diffusion plate 372 may be transmitted to the third diffusion plate 373 at an angle between −α and α. Light passing through a diffusion plate may be defined as output light.

As illustrated in FIG. 15, the output light of the third diffusion plate 373 may include more short-wavelength (B) light than long-wavelength (R) light for most of the angle from −α to α.

Referring to FIGS. 16 and 17, diffusion plate block 301 applied to a light source device for calibrating an image sensor according to various embodiments of the present disclosure may include a first diffusion plate 374, a second diffusion plate 375, and a third diffusion plate 376. The first diffusion plate 374, the second diffusion plate 375, and the third diffusion plate 376 may be identical to the first diffusion plate 371, the second diffusion plate 372, and the third diffusion plate 373 in size and material to provide for a more clear comparison. The diffusion plates in the diffusion plate blocks 300 and 301 may have various sizes and may be formed of various materials. The first diffusion plate 374 may be spaced from the second diffusion plate 375 by the second gap g2, and the second diffusion plate 375 may also be spaced from the third diffusion plate 376 by the second gap g2. The second gap g2 may be larger than the first gap g1. Light passing through the first diffusion plate 374 may be transmitted to the second diffusion plate 375 at an angle between −β and β. Likewise, light passing through the second diffusion plate 375 may be transmitted to the third diffusion plate 376 at an angle between −β and β, where β may be smaller than α.

As described above, as the diffusion plates are spaced farther from each, other, output light passing through the third diffusion plate 376 may include the short-wavelength (B) light at a larger proportion than the long-wavelength (R) light, as illustrated in FIG. 17. In this manner, the light source device for calibrating an image sensor according to the various embodiments of the present disclosure may control the ratio between the short wavelength and the long wavelength of output light by controlling a gap between adjacent diffusion plates.

There may be a larger relative intensity before and after passing through the diffusion plates of the diffusion plate block 300 spaced apart from each other by the first gap g1 than before and after passing through the diffusion plates of the diffusion plate block 301 spaced apart from each other by the second gap g2. This is illustrated in FIG. 18 where the line 311 is for light passing through the diffusion plate block 300 with the first gap g1 and line 310 is for light passing through the diffusion plate block 301 with the second gap g2. A variation in the relative intensity of light before and after passing through adjacent diffusion plates may be proportional to the gap between the adjacent diffusion plates.

Figure 19:
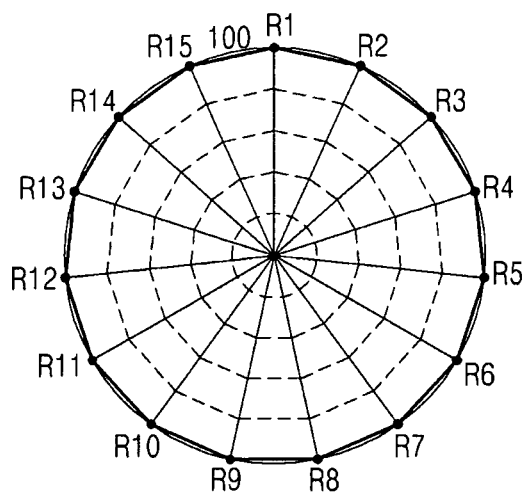
FIG. 19 illustrates the color rendering properties of light in a light source device according to various embodiments of the present disclosure.
Figure 20:
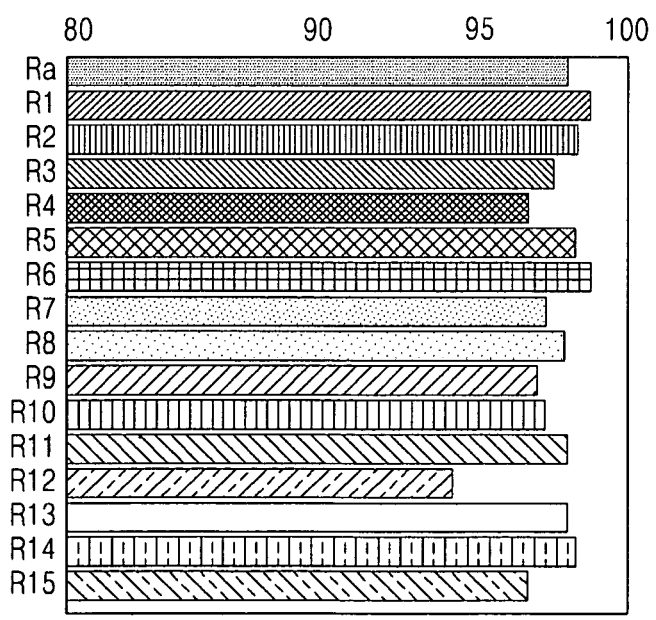
FIG. 20 illustrates indexes indicating color rendering properties of light in a light source device according to various embodiments of the present disclosure.

FIG. 19 illustrates color rendering properties of light in a light source device according to the various embodiments of the present disclosure, and FIG. 20 illustrates indexes indicating color rendering properties of light in a light source device according to the various embodiments of the present disclosure.

Referring to FIGS. 19 and 20, the labels R1, R2, R3, R4, R5, R6, R7, R8, R9, R10, R11, R12, R13, R14, and R15 represent colors according to wavelengths of light. R1 represents light greyish red, R2 represents dark greyish yellow, R3 represents strong yellow green, R4 represents moderate yellowish green, R5 represents light bluish green, R6 represents light blue, R7 represents light violet, R8 represents light reddish purple, R9 represents strong red, R10 represents strong yellow, R11 represents strong green, strong blue, R12 represents lighter skin color, R13 represents moderate olive green, and R14 represents darker skin color. Herein, the color rendering property Ra may be light having wavelengths of R1 to R15. If the output light of the light source device 100 or 200 is close to sun light, the color rendering property Ra of the light source device may be 100. As illustrated in FIG. 20, the color rendering property Ra of the output light of the light source device for calibrating an image sensor according to the various embodiments of the present disclosure may be equal to or larger than 96%. That is, the output light of the light source device according to the various embodiments of the present disclosure may be high-color-rendering light.

Figure 21:
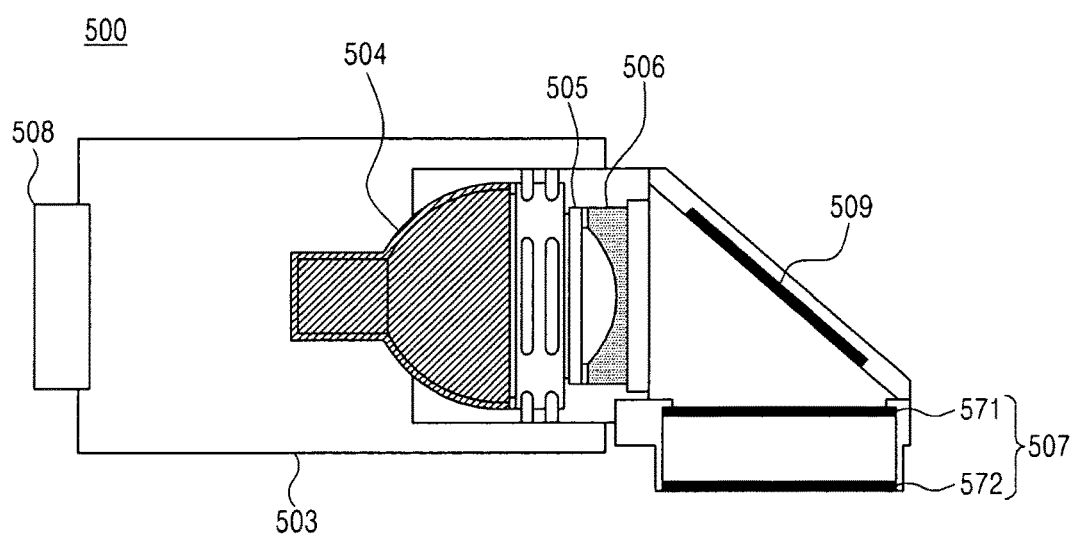
FIG. 21 illustrates a light source device for calibrating an image sensor according to various embodiments of the present disclosure.

FIG. 21 illustrates a light source device for calibrating an image sensor according to another of the various embodiments of the present disclosure. A light source device 500 for calibrating an image sensor according to another embodiment of the present disclosure may include a light source body 503, a light source unit 504, a transform filter unit 505, a concave lens unit 506, diffusion plate block 507, and a fan 508. If a component according to this embodiment is similar to a component according to any of the foregoing embodiments, a description of the component will not be provided herein.

Referring to FIG. 21, the light source device 500 for calibrating an image sensor according to another embodiment of the present disclosure may further include a mirror unit 509.

The mirror unit 509 may change the path of light passing through the concave lens unit 506 and transmit the light in the changed path to the diffusion plate block 507. The diffusion plate block 507 may comprise diffusion plates 571 and 572. The mirror unit 509 may be tilted with respect to the concave lens unit 506. Also, the mirror unit 509 may be tilted with respect to the diffusion plate block 507. The mirror unit 509 may include a general mirror. However, the mirror unit 509 may be formed of various materials that are able to reflect light, and is not limited to just a mirror. Light output from the concave lens unit 506 may be reflected from the mirror unit 509 and then travel to the diffusion plate block 507. The diffusion plate block 507 may be disposed perpendicularly to the concave lens unit 506. The diffusion plate block 507 need not be limited to being exactly 90° to the concave lens unit 506.

The light source device 500 for calibrating an image sensor according to another embodiment of the present disclosure may change the positions of the diffusion plate block 507 by changing the path of light passing through the concave lens unit 506 by means of the mirror unit 509 and providing the light to the diffusion plate block 507 in the changed path. Further, as the positions of the diffusion plate block 507 are changed, an electronic device with the light source device mounted in it may be miniaturized by modifying the structure of the electronic device.

As described before, a light source device may comprise a light source unit configured to output light comprising long-wavelength light and short-wavelength light, a transform filter unit configured to transform the light to a transformed light by controlling a color temperature of the light according to a wavelength of the light and to output the transformed light comprising transformed long-wavelength light and transformed short-wavelength light, and diffusion plates in a diffusion plate block configured to control a ratio of the transformed long-wavelength light to the transformed short-wavelength light.

According to various embodiments, the light source unit may be a halogen lamp with peak light intensity at wavelengths from substantially 700 nm to substantially 900 nm.

According to various embodiments, the halogen lamp may output light having a color temperature ranging from substantially 2700 K to substantially 3100 K.

According to various embodiments, the light source device may comprise a power source unit configured to supply adjustable power to the light source unit.

According to various embodiments, the light source unit may be configured to output a first light to the transform filter unit if the light source unit receives a first power from the power source unit, and the transform filter unit may be configured to transform the first light to output a transformed light whose intensity increases as the wavelength of the transformed light increases.

According to various embodiments, the light source unit may be configured to output a second light to the transform filter unit if the light source unit receives a second power larger than the first power from the power source unit, and the transform filter unit may be configured to transform the second light to output the transformed light whose intensity increases as a wavelength of the transformed light increases to a first wavelength, and then the intensity of the transformed light decreases as its wavelength continues to increase beyond the first wavelength.

According to various embodiments, a ratio of the transformed short-wavelength light and the transformed long-wavelength light output by the diffusion plate block may be controlled by adjusting a gap between adjacent diffusion plates in the diffusion plate block.

According to various embodiments, the diffusion plate block may include a first diffusion plate and a second diffusion plate for receiving transformed light from the first diffusion plate, and where the amount of transformed light output by the second diffusion plate and a ratio of the transformed short-wavelength light and the transformed long-wavelength light may be controlled by adjusting a gap between the first diffusion plate and the second diffusion plate.

According to various embodiments, a variation in intensity of the transformed light before the transformed light passes through the first and second diffusion plates and after the transformed light passes through the first and second diffusion plates may be proportional to the gap between the first diffusion plate and second diffusion plate.

According to various embodiments, the light source device for calibrating an image sensor may further include a concave lens unit, between the transform filter unit and the diffusion plate block, configured to control distribution of the transformed light through the transform filter unit.

According to various embodiments, the concave lens unit may be movable between the transform filter unit and the diffusion plate block.

According to various embodiments, the light source device for calibrating an image sensor may further include a rail unit between the transform filter unit and the diffusion plate block; and a movement unit coupled to the concave lens unit where the movement unit is configured to move along the rail unit.

According to various embodiments, the light source device for calibrating an image sensor may further include a mirror unit for changing a path of the transformed light passing through the concave lens unit to the diffusion plates.

According to various embodiments, the diffusion plates may be disposed perpendicularly to the concave lens unit.

According to various embodiments, the light source device for calibrating an image sensor may further include a light source body in which the light source unit and the transform filter unit are provided, and a fan for discharging heat inside the light source body to the outside.

Various embodiments of the invention may also disclose outputting light by a light source unit, where the light comprises long-wavelength light and short-wavelength light. The light may be transformed to a transformed light by controlling a color temperature of the light according to a wavelength of the light, where the transformed light comprises transformed long-wavelength light and transformed short-wavelength light. A ratio of the transformed long-wavelength light to the transformed short-wavelength light may be controlled by a diffusion block comprising diffusion plates.

Outputting the light may further comprise outputting a first light if a first power is provided to the light source unit, and the first light is transformed to the transformed light whose intensity increases as the wavelength of the transformed light increases.

Outputting the light may further comprise outputting a second light if a second power larger than the first power is provided to the light source unit, and the second light is transformed to the transformed light whose intensity increases as a wavelength of the transformed light increases to a first wavelength, and then the intensity of the transformed light decreases as its wavelength continues to increase beyond the first wavelength.

The ratio of the transformed short-wavelength light and the transformed long-wavelength light may be controlled by adjusting a gap between adjacent diffusion plates.

Distribution of the transformed light to the diffusion plate block may be controlled by adjusting a path of the transformed light.

As is apparent from the foregoing description, the light source device for calibrating an image sensor according to various embodiments of the present disclosure may control the wavelength of output light by use of a plurality of diffusion plates. Also, the wavelength of the output light may be controlled by controlling a gap between adjacent diffusion plates. Further, the light source device including a concave lens unit may be miniaturized since the gap between the transform filter unit and the diffusion plates can be reduced.

While the disclosure has been shown and described with reference to certain exemplary embodiments thereof, it will be understood by those skilled in the art that various changes in form and details may be made therein without departing from the spirit and scope of the disclosure as defined by the appended claims and their equivalents.

What is claimed is:
1. A light source device comprising:
a light source unit configured to output light comprising long-wavelength light and short-wavelength light;
a transform filter unit configured to transform the light to a transformed light by controlling a color temperature of the light according to a wavelength of the light and to output the transformed light comprising transformed long-wavelength light and transformed short-wavelength light;
diffusion plates in a diffusion plate block configured to control a ratio of the transformed long-wavelength light to the transformed short-wavelength light;
a concave lens unit, between the transform filter unit and the diffusion plate block, configured to distribute the transformed light through the transform filter unit; and
a light source body for mounting the light source unit and the transform filter unit therein,
wherein the diffusion plates are configured to receive the light which is emitted, from the light source unit and passed through the transform filter unit, wherein the diffusion plate block includes a first diffusion plate and a second diffusion plate for receiving the transformed light from the first diffusion plate, and wherein an amount of the transformed light output by the second diffusion plate and a ratio of the transformed short-wavelength light to the transformed long-wavelength light is controlled by adjusting a distance between the first diffusion plate and the second diffusion plate.

2. The light source device of claim 1, wherein the light source unit is a halogen lamp that has a peak light intensity at wavelengths from substantially 700 nm to substantially 900 nm.

3. The light source device of claim 2, wherein the halogen lamp outputs light having a color temperature ranging from substantially 2700K to substantially 3100K.

4. The light source device of claim 1, further comprising a power source unit configured to supply adjustable power to the light source unit.

5. The light source device of claim 4, wherein the light source unit is further configured to output a first light to the transform filter unit in response to the light source unit receiving a first power from the power source unit, and wherein the transform filter unit is further configured to transform the first light to output a transformed light whose intensity increases as a wavelength of the transformed light increases.

6. The light source device of claim 5, wherein the light source unit is further configured to output a second light to the transform filter unit in response to the light source unit receiving a second power larger than the first power from the power source unit, and the transform filter unit is further configured to transform the second light to output the transformed light, and wherein the intensity of the transformed light increases as a wavelength of the transformed light increases to a first wavelength, and then the intensity of the transformed light decreases as its wavelength continues to increase beyond the first wavelength.

7. The light source device of claim 1, wherein a variation in intensity of the transformed light before the transformed light passes through the first diffusion plate and the second diffusion plate and after the transformed light passes through the first diffusion plate and the second diffusion plate is proportional to the distance between the first diffusion plate and second diffusion plate.

8. The light source device of claim 1, wherein the concave lens unit is movable between the transform filter unit and the diffusion plate block.

9. The light source device of claim 8, further comprising:
a rail unit between the transform filter unit and the diffusion plate block; and
a movement unit coupled to the concave lens unit, wherein the movement unit is configured to move along the rail unit.

10. The light source device of claim 1, further comprising a mirror unit for changing a path of the transformed light passing through the concave lens unit to the diffusion plates.

11. The light source device of claim 10, wherein the diffusion plates are disposed at an angle to the concave lens unit.

12. The light source device of claim 1, further comprising:
a fan for externally discharging heat from the light source body.

13. A method comprising:
outputting light by a light source unit mounted in a light source body, wherein the light comprises long-wavelength light and short-wavelength light;
transforming the light to a transformed light by controlling a color temperature of the light according to a wavelength of the light, wherein the transformed light comprises transformed long-wavelength light and transformed short-wavelength light, by a transform filter unit mounted in the light source body; and
controlling a ratio of the transformed long-wavelength light to the transformed short-wavelength light by a diffusion block comprising diffusion plates,
wherein the diffusion plates are configured to receive the light which is emitted from the light source unit and passed through the transform filter unit and passed through a concave lens,
wherein a diffusion plate block includes a first diffusion plate and a second diffusion plate for receiving the transformed light from the first diffusion plate, and
wherein an amount of the transformed light output by the second diffusion plate and a ratio of the transformed short-wavelength light to the transformed long-wavelength light is controlled by adjusting a distance between the first diffusion plate and the second diffusion plate.

14. The method of claim 13,
wherein the outputting of the light further comprises outputting a first light in response to a first power being provided to the light source unit, and
wherein the first light is transformed into the transformed light whose intensity increases as a wavelength of the transformed light increases.

15. The method of claim 14,
wherein the outputting of the light further comprises outputting a second light in response to a second power larger than the first power being provided to the light source unit, and the second light is transformed to the transformed light, and
wherein the intensity of the transformed light increases as the wavelength of the transformed light increases to a first wavelength, and then the intensity of the transformed light decreases as its wavelength continues to increase beyond the first wavelength.

16. The method of claim 13, wherein the ratio of the transformed long-wavelength light and the transformed short-wavelength light is controlled by adjusting a distance between adjacent diffusion plates.

17. The method of claim 13, further comprising controlling distribution of the transformed light to the diffusion plate block by adjusting a path of the transformed light.

* * * * *